Nov. 13, 1962     H. S. VAN BUREN, JR     3,063,115

MOLDING FASTENER

Filed April 18, 1960

Inventor:
Harold S. Van Buren Jr.
by James B. Tiffany Jr.
Atty.

3,063,115
MOLDING FASTENER

Harold S. Van Buren, Jr., Cambridge, Mass., assignor to United-Carr Fastener Corporation, Cambridge, Mass., a corporation of Delaware
Filed Apr. 18, 1960, Ser. No. 22,972
1 Claim. (Cl. 24—73)

This invention relates generally to fastening devices and in particular to an improved device for securing trim moldings or the like to automotive bodies.

Various means have heretofore been used to secure decorative moldings to the exterior surface of automobile bodies which mainly have consisted of fasteners adapted to be secured to flat surfaces. A definite need has developed in the industry for a fastener adapted to secure molding to other than flat surfaces such as peaked exteriors, yet sufficiently universal to be used on flat surfaces.

The object of the invention is to provide a molding fastener for use with an apertured work support having a minimal insertion pressure yet uniquely constructed to resist removal by forces normal to the plane of the work support.

A further object of this invention is to provide a molding fastener which may be simply and economically formed from a single strip of sheet metal for use with a high crown molding.

Another object of the invention is to provide a molding fastener adapted for use with irregular surfaces having self-locking features.

Other objects of the invention will, in part, be obvious, and will, in part, appear hereinafter.

Figure 1:
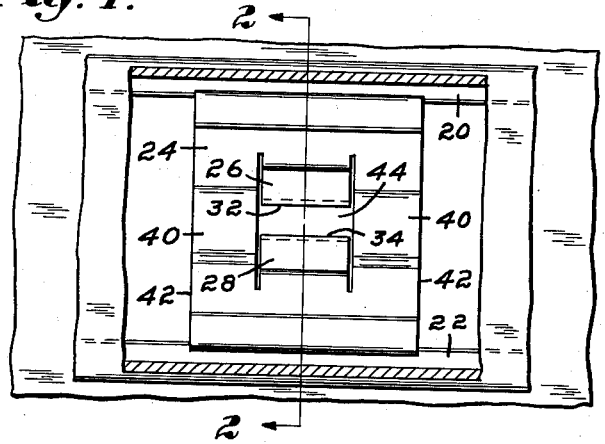
FIG. 1 is a top plan view of the fastener assembled on a work support, partly in section.
Figure 2:
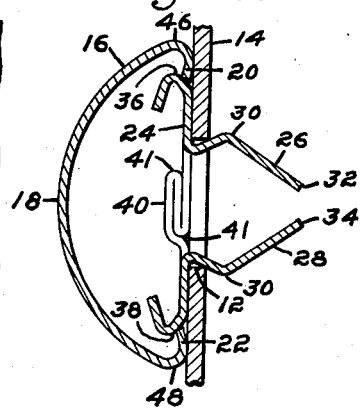
FIG. 2 is a view section taken on line 2—2 of FIG. 1.
Figure 3:
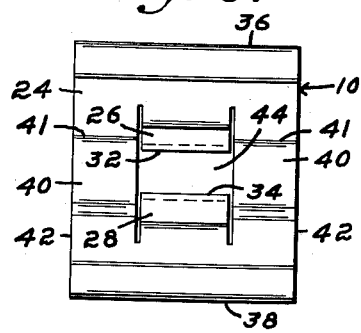
FIG. 3 is a top plan view of the fastener.

Referring the the drawings, there is illustrated a molding fastener 10 adapted for axial insertion in an aperture 12 of a work support 14 to retain a trim molding 16 in assembly. The molding 16, for which the fastener is best adapted, is of the channel shaped type having a high crown 18 with the distal ends 20 and 22 extending inwardly toward each other.

The fastener 10 is constructed from a single strip of sheet metal and comprises a base 24 having a pair of spaced legs 26 and 28 of lesser width than the base, struck out or formed from the medial lateral section of the base 24 and extending away from each other and then converging toward each other defining a shoulder 30 which is spaced from the base a distance at least equivalent to the panel thickness. The distal ends 32 and 34 of the legs 26 and 28 terminate in spaced relation to each other providing a relative degree of flexibility. The base 24 is provided with outwardly and inwardly curved flanges 36 and 38 at opposed edges adapted for cooperate snap engagement with the distal ends 20 and 22 of the molding.

Figure 4:
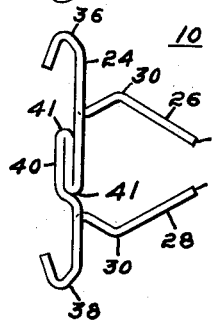
FIG. 4 is a view in side elevation of the fastener.
Figure 5:
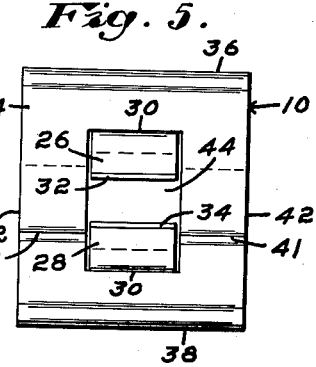
FIG. 5 is a bottom plan view of the fastener.

Referring to FIG. 4, it will be seen that the base 24 has web portions 40 folded upward and back upon themselves forming a double bight 41 which is incompressible along parallel and normal planes but flexible in an upward direction, the material being entirely taken from the base 24 and forming a triple layer of metal on each of the sides 42 adjacent a central aperture 44. This particular fastener construction having a webbed base results in legs with exceptionally long length in relation to the base and will provide a greater holding power. To assemble the fastener, the legs 26 and 28 are snapped into engagement with the walls of the aperture 12, the converging legs providing a camming action whereby the wall of the aperture 12 acting on the shoulder 30 causes the web 40 to flex upwardly shortening the length of the base sufficiently to allow the legs to snap into engagement with the support 14 so that the shoulders 30 cooperate with the base 24 to retain the support therebetween. The molding 16 is then snapped into engagement with the curved flanges 36 and 38. It will readily be seen that forces acting on the molding 16 to remove it from the fastener are usually exerted on the extremities 46 and 48 and normal to the plane of the support 14 and due to the incompressible nature of the web 40, tend to cause the web to flex downwardly in the direction of the legs resulting in their further divergence. Forces exerted coplanar to the base are resisted due to the incompressibility of the opposed bight portions 41 and the tendency of the web to remain in its folded state.

Figure 6:
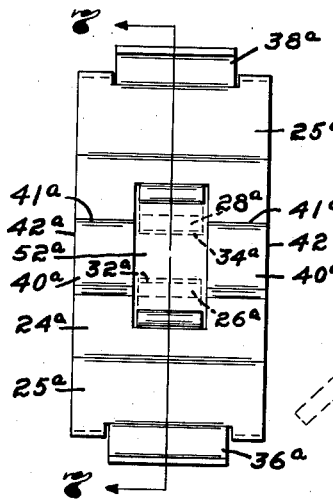
FIG. 6 is a top plan view of a modified form of the fastener.
Figure 7:
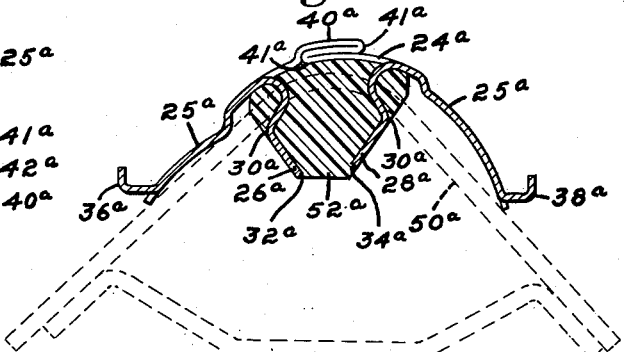
FIG. 7 is a view taken on line 7—7 of FIG. 6.

The modified form of this fastener for use with peaked surfaces as illustrated in FIGS. 6 and 7 provides a base 24a having a pair of arcuate arms 25a on either side of the web 40a. The legs 26a and 28a have a shoulder 30a disposed intermediate the base and the distal ends 32a and 34a a distance equivalent to the work thickness. The upwardly curved flanges 36a and 38a are more pronounced than in the basic form shown in FIGS. 1 through 5 but are adapted for snap engagement with a specific molding (not shown) having an exceptionally high crown.

The legs 26a and 28a are formed slightly offset from each other to conform to the shape of the peaked exterior 50a.

FIG. 7 has been illustrated with a sealer 52a which may be used with this type of installation to prevent the ingress of water.

Since certain other obvious modifications may be made in this device without departing from the scope of the invention, it is intended that all matter contained herein be interpreted in an illustrative and not in a limited sense.

I claim:

A snap fastener for attaching a hollow molding to a support, said snap fastener being formed from a single piece of metal and having a frame-like base having outer and inner peripheries, a pair of opposed legs extended from the inner periphery of said base, said legs shaped to provide a flexible snap fastener stud, said legs being formed from metal taken from the center of said base, said base being folded back upon itself and against said base intermediate the ends and opposite sides of said frame to be in a plane parallel to the remaining portion of the base, to foreshorten the base, thereby arranging the legs a predetermined distance from each other where they join the base and leaving the base relatively rigid in the plane of the base and molding engaging means integral with said base.

References Cited in the file of this patent
UNITED STATES PATENTS

| | | |
|---|---|---|
| 2,147,943 | Churchill | Feb. 21, 1939 |
| 2,746,111 | Chvosta | May 22, 1956 |
| 2,875,487 | Holton | Mar. 3, 1959 |